United States Patent
Marshall (10) Patent No.: US 7,550,699 B1
(45) Date of Patent: Jun. 23, 2009

(54) REMOVAL OF UNWANTED REFLECTIONS IN AUTOFOCUS SYSTEMS

(76) Inventor: Daniel R. Marshall, 3130 Victory View Dr., Boise, ID (US) 83709

( * ) Notice: Subject to any disclaimer, the term of this patent is extended or adjusted under 35 U.S.C. 154(b) by 0 days.

(21) Appl. No.: 12/143,412

(22) Filed: Jun. 20, 2008

(51) Int. Cl.
G02B 27/40 (2006.01)
G02B 7/04 (2006.01)
G02B 21/00 (2006.01)

(52) U.S. Cl. ............... 250/201.4; 250/201.3; 359/383; 359/389

(58) Field of Classification Search ............ 250/201.2, 250/201.3, 201.4; 359/368, 379, 383, 385, 359/389
See application file for complete search history.

(56) References Cited

U.S. PATENT DOCUMENTS

| | | | |
|---|---|---|---|
| 5,932,871 A * | 8/1999 | Nakagawa et al. ....... | 250/201.3 |
| 6,879,440 B2 * | 4/2005 | Cemic et al. ............. | 359/385 |
| 7,071,451 B2 | 7/2006 | Ishikawa et al. | |
| 7,348,528 B2 | 3/2008 | Marshall | |
| 2007/0138371 A1 | 6/2007 | Marshall | |

* cited by examiner

Primary Examiner—Kevin Pyo
(74) Attorney, Agent, or Firm—Your Intellectual Property Matters, LLC; Robert A. Frohwerk (57) ABSTRACT

A focus sensing system adaptable for use in microscopes or other optical systems incorporates a selective beam block. An outgoing reference beam, incident upon a target to be inspected, is reflected to become an incoming reference beam. A beam block inserted within the optical system selectively rejects unwanted reflections from surfaces other than the target allowing the desired incoming reference beam to be photodetected without interference from reflections off of surfaces that are not of interest. The photodetector generates an electronic signal corresponding to the displacement of the target from the ideal focal point. The electrical signal may be used to drive a servomechanism to displace either the target or the microscope objective lens to bring the target into focus.

13 Claims, 6 Drawing Sheets

REMOVAL OF UNWANTED REFLECTIONS IN AUTOFOCUS SYSTEMS

CROSS-REFERENCES TO RELATED APPLICATIONS

U.S. patent application Ser. No. 11/312,034 filed Dec. 20, 2005, now U.S. Pat. No. 7,348,528, entitled "Distance Measuring System," is incorporated here by reference.

U.S. patent application Ser. No. 11/614,234 filed Dec. 21, 2006, published as U.S. Pre-Grant Publication No. 2007/0177470, entitled "Distance Measuring System," is incorporated here by reference.

STATEMENT REGARDING FEDERALLY SPONSORED RESEARCH OR DEVELOPMENT

Not Applicable.

FIELD OF THE INVENTION

The present invention relates generally to optical systems for sensing the distance to a surface. In particular, this invention is of an optical apparatus and methods for detecting and maintaining focus on an object.

BACKGROUND OF THE INVENTION

A focus sensing system is an optical device that senses the state of focus of an image-forming device by emitting one or more beams of light that are made to reflect from the surface under examination. The reflected light is then collected and processed to determine the distance between the objective lens and the target object being examined. Such a focus sensing system may simply measure the distance between the objective lens and the target, or it may be used to enable control of the state of focus. In the latter instance, it may be used as a component of a focus controlling system, that is, an autofocus system.

Many devices in the prior art project a spot of light through a circular objective lens onto a target surface. Other focus sensing devices have used one or more toric lenses to form a line focus which is projected onto a target surface. In general, a toric lens is one which has different curvatures in two principle sections. A cylinder lens is a limiting case of a toric lens where the radius of curvature in one section is infinite, that is, the section is flat, while the radius of curvature in the other section is finite, but non-zero. Toric lenses introduce astigmatism into the outgoing beam of light. Instead of having a single point focus, an astigmatic system has two line foci. Where astigmatic lenses have been used previously by others, only one of the two astigmatic line foci has been used. In those applications the line focus has been used to perform an averaging function in order to reduce the effect of local asperities in the surface under observation.

While such an arrangement can be optimized for measuring the distance to a single reflective surface, it has fundamental difficulties when it is used to measure distance to an object or surface that is buried in a transparent medium. These problems result from the fact that the discontinuity in the refractive index at boundaries, even between transparent interfaces, still produces a reflection. Such a reflection creates its own signal, confusing the returned position signal from the intended target. The result is degraded image quality because of imperfect focus.

Various techniques have been used in attempts to overcome these error mechanisms. For example, an electrical, mechanical or optical offset may be introduced to offset the signal from an unwanted surface. Unfortunately this offset can only correct the net focus error signal if the reflectance of the unwanted surface does not change, or the distance between the surfaces remains constant. The general result is that previously used methods remain susceptible to many factors, resulting in errors in the distance measurement and a consequential degradation in the quality of the image.

BRIEF SUMMARY OF THE INVENTION

The presently described systems and methods provide a means of autofocus that remains highly reliable even when confronted by effects that would be detrimental to a proper focus. Some such effects are thickness of the specimen, reflectance from various surfaces, and tilt of the target. When not properly addressed, these effects will degrade the ability to retain correct focus, diminishing the quality of the image.

The described autofocus system reliably measures focus inside of a transparent medium by optically blocking the light reflected from a surface that is not of interest while allowing light from the target to pass through to the focus sensor. In one embodiment a single point focus with suitable relay optics is used to form an intermediate aerial image of one surface. Another embodiment uses a toric element to create a pair of line foci in which one focus is projected onto one surface, and the second focus is projected onto a second surface. In either embodiment most of the light reflected from the surface of interest is allowed to pass unblocked through the system to be used to measure the focus while a beam block removes the light reflected from another surface.

The described embodiments may be adapted for use in a microscope or other industrial inspection or measurement systems with a minimum of impact on the optical characteristics of the original system. The distance information may be used to drive a servomechanism to adjust focus, or alternatively, to generate data regarding the topography of the target surface.

Embodiments of the present invention include a light source emitting a collimated reference beam of light. A portion of the reference beam is blocked by a knife-edge element. The remaining outgoing reference beam travels to the target surface, where it is reflected to become an incoming reference beam on the opposite side of an optical axis. The incoming reference beam is diverted by the reflecting surface of the knife-edge element to a photodetector that generates an electronic output signal according to the position of the incoming reference beam on the surface of the photodetector. The signal generally corresponds to the distance from the objective lens of the microscope to the target surface and may be used to generate an output signal. The knife-edge element enables the incoming reference beam to generally follow the path that would have been taken by the blocked portion of the outgoing reference beam.

A scanning mirror may be included in any embodiment of the presently described system to controllably deflect the outgoing reference beam and the incoming reference beam. Because the two reference beams generally follow the same optical path, the deflection of the incoming reference beam compensates for the deflection of the outgoing reference beam, so that the position of the incoming reference beam on the surface of the photodetector is generally independent of the deflection of the outgoing reference beam made by the scanning mirror. In this way, the measured distance is unaffected by scanning the outgoing reference beam along the target. With some care being given to placement of a beam blocking element, the described systems can be made to scan in two axes for characterization of a surface.

Due to the complementary nature of the optical paths for the outgoing and incoming reference beams, the resulting system is relatively unaffected by thickness of the specimen and reflectance from surfaces other than the actual target. The described system also generally compensates for tilt of the target.

BRIEF DESCRIPTION OF THE DRAWINGS

The particular features and advantages of the invention briefly described above as well as other objects will become apparent from the following description taken in conjunction with the accompanying drawings, in which.

The following Reference Numbers may be used in conjunction with one or more of the accompanying FIGS. 1-6 of the drawings:

100 Focus System
110 Light Source
120 Photodetector
130 Objective Lens
140 Beamsplitter
145 Beam Block
150 Afocal Relay
152 Relay Lens, first
155 optical center of relay
158 Relay Lens, second
160 Cylinder Lens, first
165 Beam Block
170 Knife-edge element
172 Mirror, folding
175 Mirror, detector
180 Collimating Lens
185 Focusing Lens, detector
190 Cylinder Lens, second
200 Target
210 Surface of interest
215 Focus of interest
220 Surface to be rejected
225 Apparent location of reflected spot
230 Focus to be rejected
300 Light Beam, outgoing
305 Optical axis
310 Reference Beam, outgoing
320 Reference Beam, incoming
330 Incident Beam
340 Reflected Beam
350 Real Image
400 Servomechanism

DETAILED DESCRIPTION OF THE INVENTION

The focus sensing systems and methods described here may be used within an autofocus system as part of a microscope or other industrial inspection or measurement system. The described systems maintain focus with high reliability even when confronted by many challenging situations that would be detrimental to a proper focus. One such challenge is the detection of a surface that is buried in a transparent medium which causes reflections from surfaces along the optical path that are near enough to the target to cause a competing focus signal. One class of problems that is overcome by the present system relates to reflections off of transparent interfaces resulting from discontinuities in the refractive index. Another class of problems relates to opaque reflective surfaces below the target of interest. Such reflections degrade focus signals and diminish image quality, however, the presently described system maintains a high quality image in spite of variations in the thickness, reflectance or tilt of the target.

These error mechanisms have prompted others to use a technique in which a reflection from the outer surface is used as the focus sensing reference, and then either an electrical or optical offset is introduced to maintain focus on a buried target. Such an approach is used in U.S. Pat. No. 7,071,451 issued to Ishikawa et al. However, an error will occur in the distance measurement if any of the following factors occurs:

(1) The thickness between the surface and the target changes;

(2) the reflectance of either the surface or the target varies, so that there is a different combination of the signal from the front and rear surface; or (3) if the local tilt of the target changes.

This will degrade the ability to retain correct focus, and with it the quality of the image will be degraded.

The present system addresses the class of applications where it is necessary to focus a beam inside of a transparent surface under conditions where one or more of the above three parameters degrade focus sensing. This system makes it possible to reliably measure focus inside of a transparent medium in spite of the thickness of the medium, its reflectance, and variations in tilt. This goal is accomplished by optically blocking the light reflected from the unwanted surface while allowing light from the target to pass through to the focus sensor.

An embodiment of this system uses a point focus, either scanned or stationary, and suitable relay optics so that an intermediate aerial image of one surface is formed. It is then possible to introduce a beam block that removes all of the light reflected from one surface while letting most of the light from the other surface propagate onward where it can be used to measure the state of focus of the beam.

Each focus retains certain properties of a focused spot separately from the other. As a result, the light from one focus can be used to generate a focus error signal and the light from the other can be blocked with a narrow beam block or spatial filter. It is important to note that the light from either surface may be removed. Therefore, it becomes possible to study either surface without errors caused by light reflected from the other.

Figure 1:
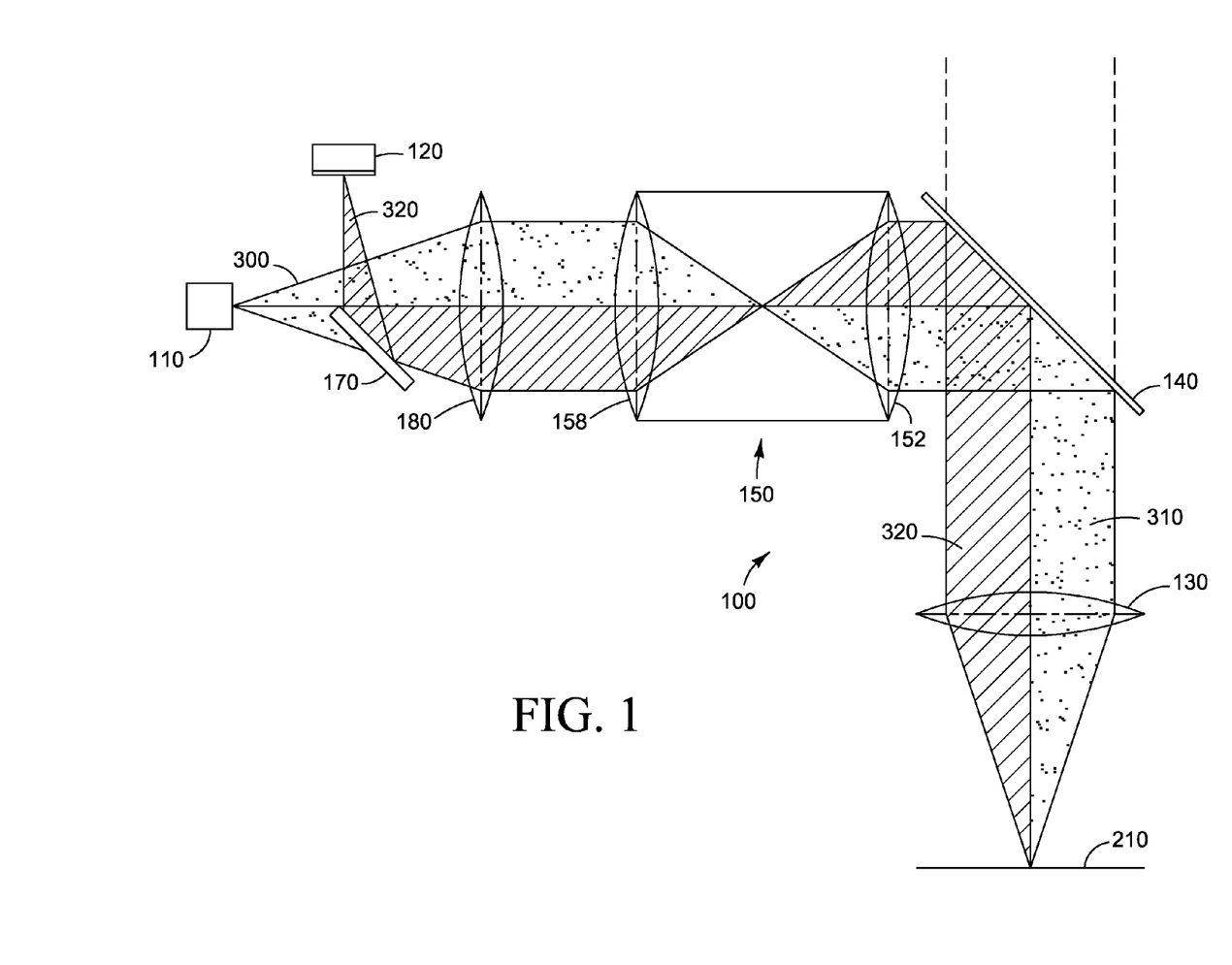
FIG. 1 shows an embodiment of the present invention in its most basic configuration prior to insertion of a beam blocking element.

A basic focus sensing system is shown in FIG. 1. Light source 110 emits an outgoing beam 300 of light, a portion of which is blocked by a knife-edge element 170. The unblocked portion of outgoing light beam 300 passes through a collimating lens 180 before entering an optical relay 150. One advantage of inserting a relay into any optical system is to provide spatial separation between optical elements without substantially impairing the focus sensing capability of the system. In the present system this spatial separation will be used for an additional purpose as will be described later.

The unblocked portion of outgoing beam 300 becomes an outgoing reference beam 310 which is reflected from beamsplitter 140 to then pass through objective lens 130 before impinging upon target surface 210. Reflection from the target 200 causes the outgoing reference beam 310 to cross the optical axis 305 to become incoming reference beam 320.

The inclusion of the beamsplitter 140 is optional, its purpose being to provide visual access through an alternate viewport as a portion of the light reflected from the target 200 passes straight through to a human user, either directly by means of viewing eyepieces, or indirectly through a camera system. Where alternate access to the optical path is not required, the beamsplitter 140 may be eliminated, resulting in an unfolded, straight optical path. When included, the beamsplitter 140 reflects the incoming reference beam 320 back through the optical relay 150 and collimating lens 180. The incoming reference beam 320 is then reflected from the backside of knife-edge element 170 to photodetector 120 which produces a focus error signal. By precisely subtending the incoming reference beam 320 over the portion of the optical path not taken by outgoing reference beam 310, knife edge element 170 performs multiple functions, acting as a knife-edge in the outgoing path, as a knife-edge in the incoming path, as a lossless beamsplitter, and as a fold mirror. Although FIG. 1 shows a single lens 180 being used both in the forward path and the return path, it is also possible to use two separate lenses: one for collimating the outgoing light and one for focusing the return light. In this alternate configuration the lenses would be placed on the other side of mirror 170, that is, the collimating lens would be placed between the light source 110 and the knife-edge element 170 while the focusing lens would be placed between the mirror 170 and the photodetector 120.

Since the paths traced by the outgoing and incoming reference beams (310 and 320, respectively) are parallel and complementary, aberrations and distortions tend to be automatically compensated resulting in a high quality image. In U.S. Pat. No. 7,348,528 Marshall describes inclusion of a scanning mirror located between optical relay 150 and collimating lens 180 whereby the target 200 may be scanned by outgoing reference beam 310 without affecting the position of the returned incoming reference beam 320 with respect to the photodetector 120. Marshall also points out that with appropriate design and placement of the collimating lens (180) and the mirrored surfaced of the knife-edge element (170), the use of an afocal relay (150) further acts to prevent artifacts in the focus error signal that might be introduced by a longer optical path.

Figure 2:
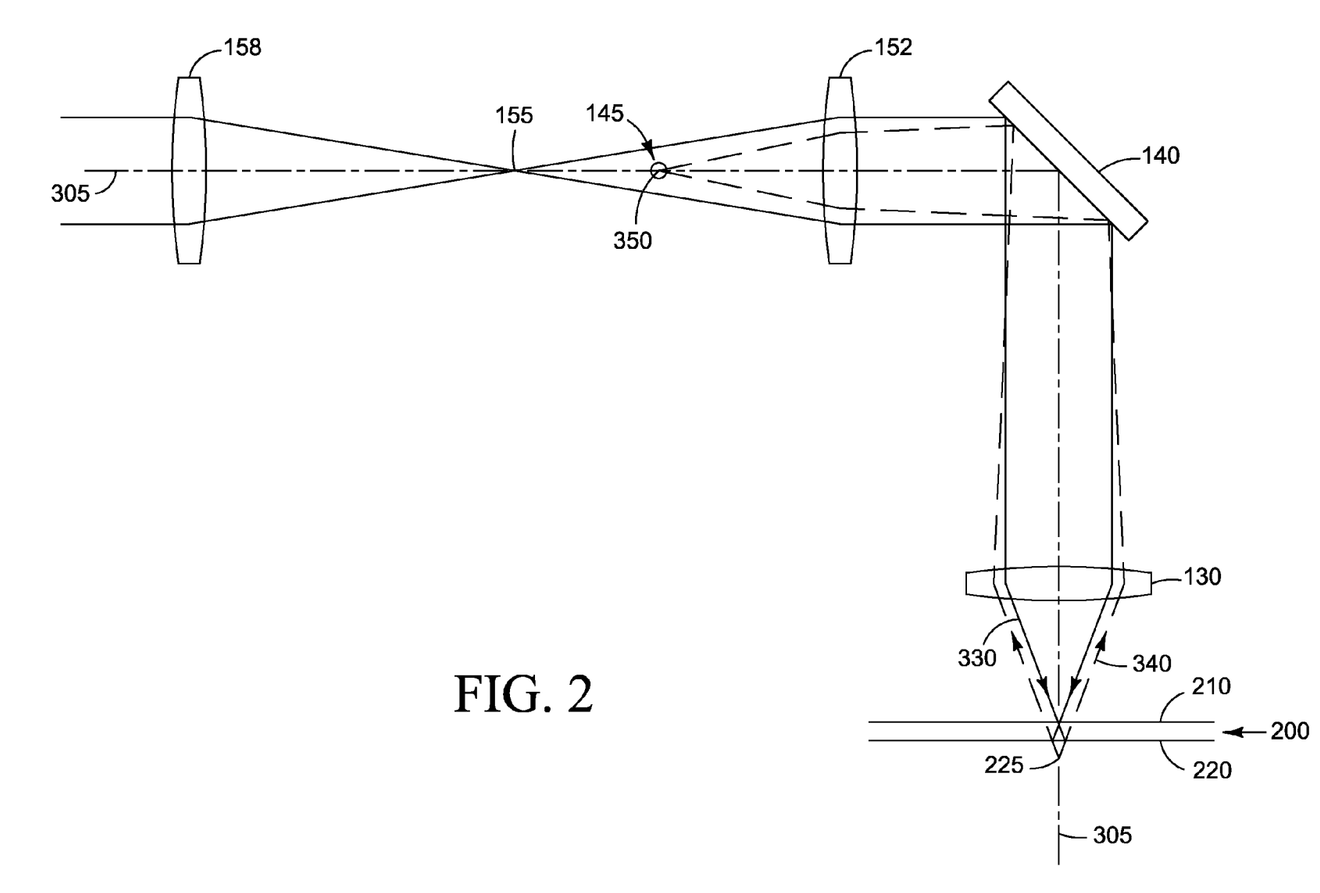
FIG. 2 is a side view of the reference beam impinging upon the target surface where another surface produces an undesirable secondary reflection.

Building upon the above-described system, it is now desired to remove unwanted reflections from surfaces or refractive interfaces other than the one of interest. Refer to FIG. 2 for a discussion of the problem and the presently introduced solution. After incident beam 330 passes through the objective lens 130, it reflects off of the target 200 at the surface of interest 210. However, depending upon the refractive index of the target 200 some of the incoming beam penetrates the first surface of the target 200 to be reflected off of its backside at surface 220 to become reflected beam 340. Tracing the reflected beam 340 backwards shows that it appears to have been reflected from a virtual focal point 225 which is beyond (below) surface 220 by a distance that may be substantially different from the thickness of the target 200, due to the fact that the longitudinal magnification of lens pair 152 and 130 may be other than one. Also, the unwanted light is reflected from the surface to be blocked 220 and the spot 225 appears to be twice as far away from the first surface 210 as the distance between the surfaces (210 and 220) of the target 200, a 2× multiplier of distance.

As the unwanted image beam 340 passes through the objective lens 130 and is reflected by the beamsplitter 140 the change in position of the apparent focus 225 results in a real image 350 that is offset from the optical center 155 of the relay 150. This offset is predictable as it is a function of the distances between the desired and unwanted surfaces (210 and 220, respectively) of the target 200 multiplied by the square of the lateral magnification of the first relay lens 152, and objective lens 130 in a first-order approximation, assuming that the first relay lens 152 has a focal length that is different from that of the objective lens 130.

Since the location of the real image 350 is predictable for a target 200 of a given thickness, a beam block 145 may be placed at that point in the optical path to remove the light reflected from the unwanted surface 220 from the incoming reference beam 320 before it reaches the photodetector 120. Since the light that is to be removed has been focused into the real image 350, in theory the beam block 145, if precisely placed, would only need to block a point.

In practice, however, the target 200 will generally exhibit some variation in thickness. While it is desirable to keep the beam block 145 small in order to avoid unnecessary loss of light reflected from the desired surface, in order to maintain a high signal to noise ratio, this design offers a fair amount of latitude. As the beam block 145 is displaced from the actual location of the real image 350 light that ought to be rejected will leak around the beam block. Increasing the size of the beam block 145 increases the capture range at the penalty of less signal light reaching the photodetector 120. In one example, a beam block is used to block a second surface that is 1.25 mm from the surface of interest and measurements show that the capture range is 1 mm in one direction and 0.5 mm in the other direction which is more than adequate for many applications.

It is to be noted here that proper placement of the beam block 145 allows for the rejection of either of the near or far surfaces. To reject light from the upper surface 210 while focusing on the lower surface 220 the beam block 145 must be shifted nearer the second relay lens 158 in which case the objective lens 130 will also need to be refocused. Furthermore, if the target consists, for example, of multiple layers of refractive material wherein the approximate thickness and variation of each layer is known, it is possible to place multiple beam blocks in the optical path to reject multiple images reflected from more than one unwanted surface. It will be recognized by a person skilled in the art that such a design must take into account reflection coefficients and distances.

Figure 3:
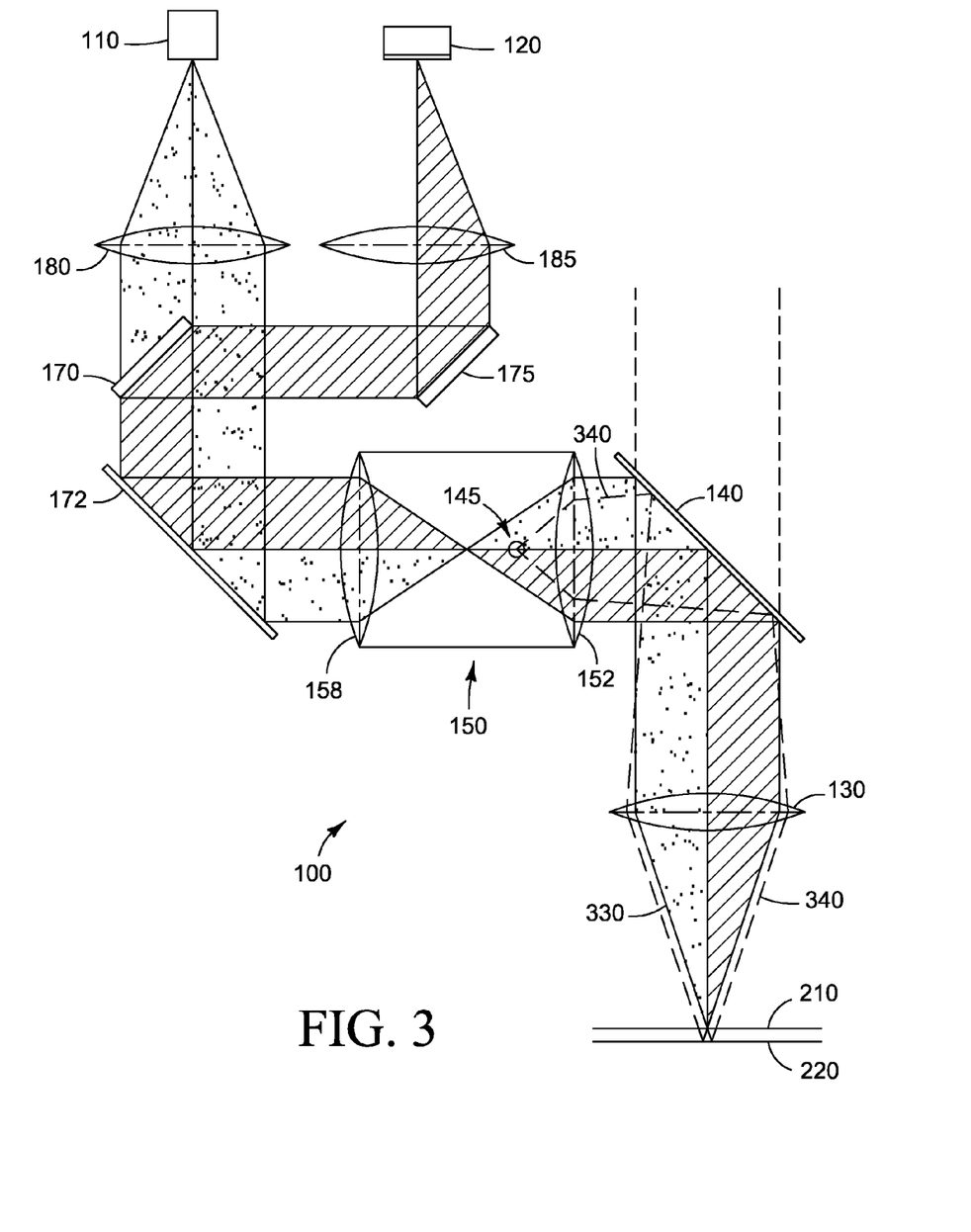
FIG. 3 shows a side view of an embodiment using a beam block within an afocal relay to remove an image produced by an undesirable reflection from the far surface of a transparent target.
Figure 4:
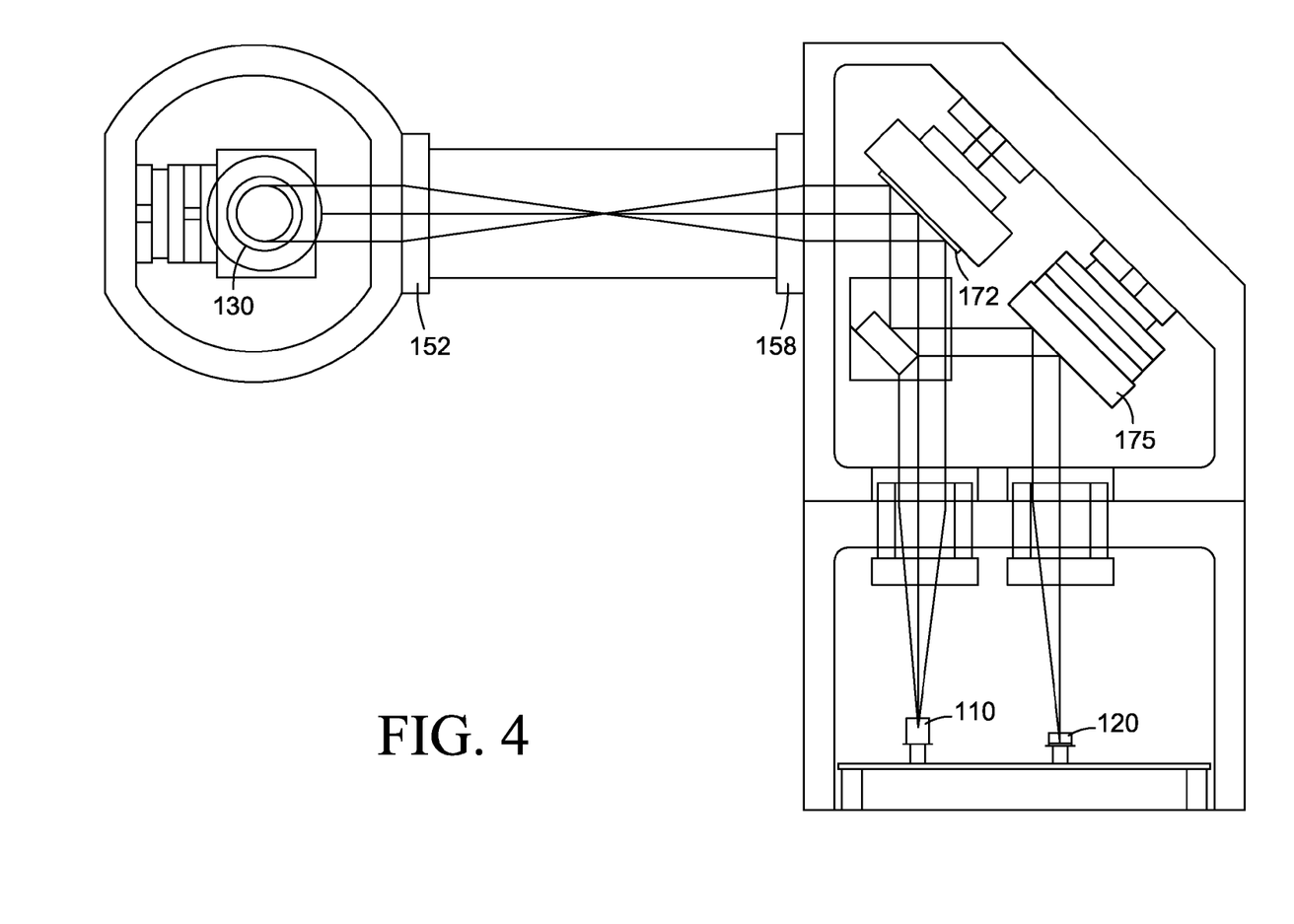
FIG. 4 is a plan view showing the layout of the components of an implementation of the system of FIG. 3 for use in a microscope.

FIG. 3 applies the teachings of FIG. 2 to the optical configuration shown in FIG. 1. To better accommodate real world applications, the optical system of FIG. 3 has been enhanced to include a folding mirror 172 placed between the optical relay 150 and the collimating lens 180. The first effect of this rearrangement is to reduce the spread of the overall system 100. This configuration allows the knife-edge element 170 to be relocated into a region of collimated light. Adding a second mirror 175 and a decollimating lens 185 to focus the incoming reference beam onto the photodetector 120 enables the light source 110 and the photodetector 120 to be constructed on a common electronic circuit card or substrate.

By driving mirror 172 with a scanner mechanism the system may be made to scan a surface of the target while still rejecting unwanted reflections. Introduction of a scanner divides the optical system into two optical spaces, a scanned space and a non-scanned space. The scanned space includes the optical path between the scanner (172) and the target 200, whereas the non-scanned space extends from the scanner to the detector 120.

The location of images within the scanned space will follow the motion of the scanner. This means that for a single-axis scanner an image that focuses to a point when unscanned will be spread into a line focus. Accordingly, the small disk that would have served as beam block 145 in an unscanned system will need to be replaced with a bar or wire having sufficient length and width to block the spread image. A two-axis scanner complicates matters but a block of appropriate size and shape may still be inserted to replace beam block 145 for a functional system.

In the non-scanned space images remain stationary; they are not affected by scanner motion. This allows the use of a scanner while retaining the small disk that served as beam block 145 of the unscanned system. However, this requires relocation of the beam block into the non-scanned space, generally near the detector 120 or its companion focusing lens 185.

Afocal relay 150 illustrates only one type of afocal relay, where lenses 152 and 158 have nominally equal focal lengths and unity magnification. However, relays of other magnifications may be used.

In a focus sensing system that uses a relay there is a location within the relay tube where there is a real image of the focused spot just as it is reflected by the unwanted surface. As has been described, this is a major advantage of using a relay. An alternate embodiment of the presently described system may be built without an afocal relay, in which case it becomes necessary to use a toric, or more specifically a cylinder lens.

Figure 5:
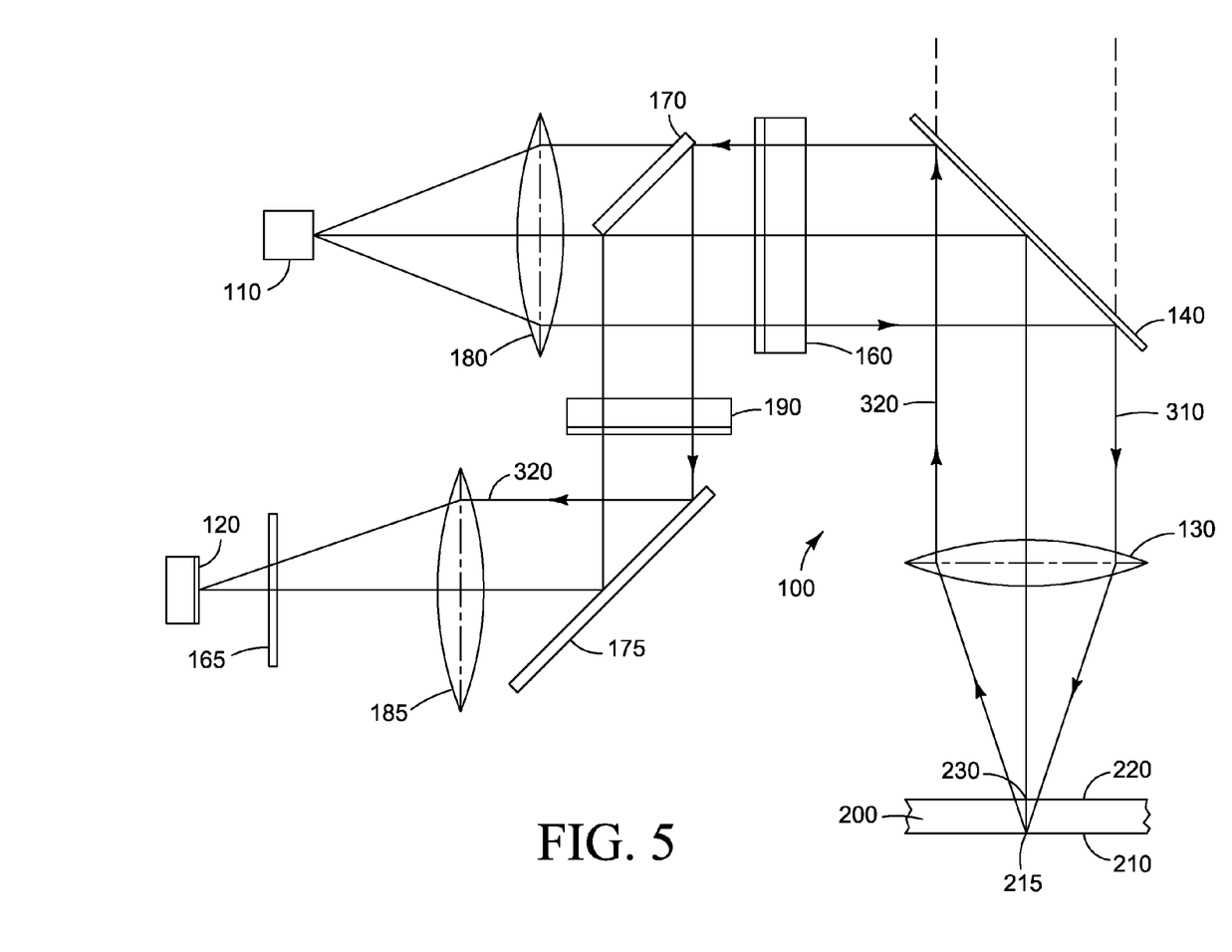
FIG. 5 shows a side view of an embodiment using toric lenses with a beam block to remove any image produced by an undesirable reflection from the near surface of a transparent target.
Figure 6:
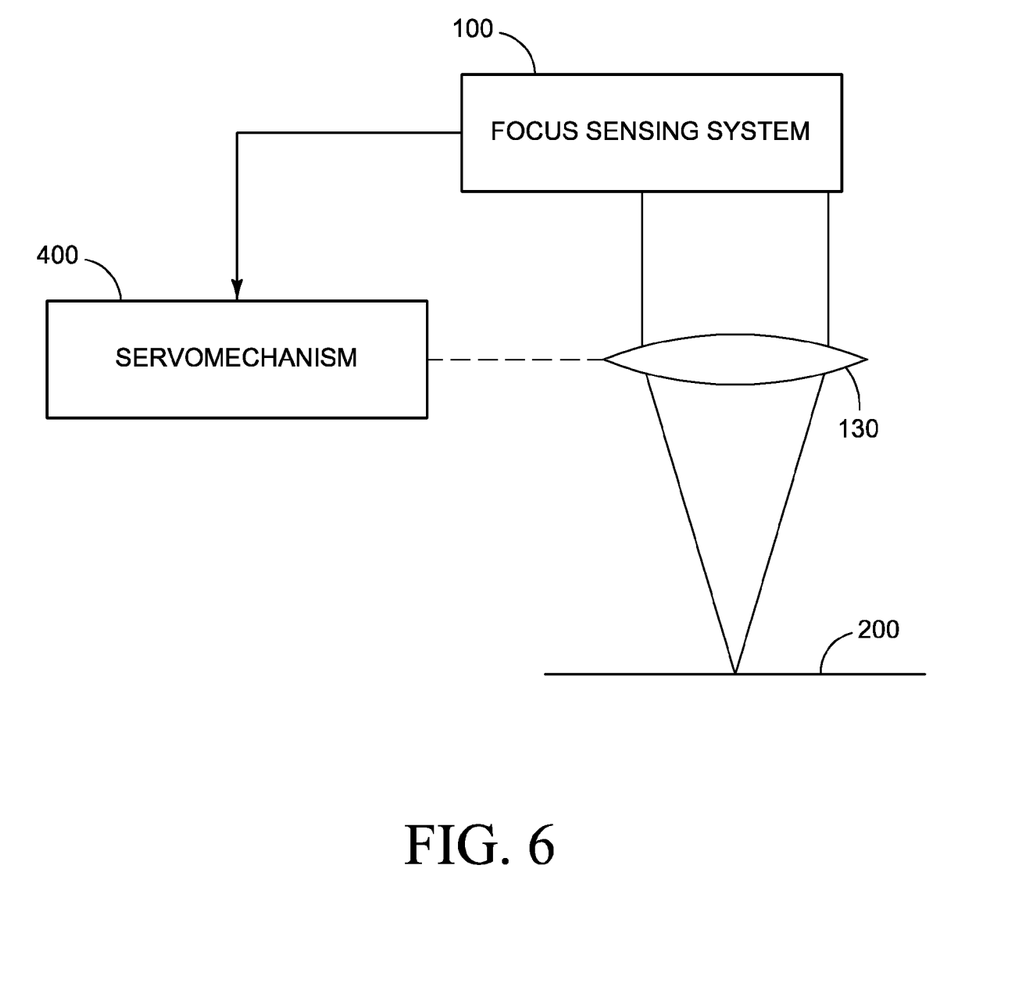
FIG. 6 is a simplified block diagram of a servo-system showing a focus sensing system as described here when used as a component of an autofocus system.

As illustrated in FIG. 5 the optical path of the toric-based system is very similar to that described above. The afocal relay 150 has been replaced by a toric, or cylindrical, lens 160. The astigmatism introduced as the outgoing beam 310 passes through the cylindrical lens 160 produces a pair of line foci rather than a single point focus. While others have designed systems around astigmatic lenses, they have used only one of the two astigmatic line foci. In those applications the line focus has been used to perform an averaging function in order to reduce the effect of local asperities in the surface under observation. The presently described system uses both line foci created by one or more toric elements in such a way that one astigmatic focus is projected on, or near to, one surface, while the second astigmatic focus is projected on, or near to, the other surface. In principle either surface can be the target surface, but in practice it is usually the buried surface 210 that is of interest while it is desired to reject reflections from the nearer surface 220.

A cylinder lens 160 placed in the outgoing reference beam 310 generates a pair of line foci which are perpendicular to one another. One of these line foci is projected onto an upper surface 220 of the target 200 while its perpendicular counterpart is adjusted to focus on the lower surface 210 of a transparent substrate. After reflection from the surfaces of the target 200, the incoming reference beam 320 passes back through cylinder lens 160. The complementary nature of this return trip through the astigmatic cylinder lens 160 effectively removes the astigmatism introduced on the forward pass while the spatial offset of the two foci is maintained.

After reflection from the knife-edge element 170 the image beam passes through a second cylinder lens 190 which again produces a pair of line foci. Photodetector 120 is located to intercept the line focus returned from the surface of interest 210. A beam block 165 is placed in the path of the incoming reference beam 320 to block the image returned from the unwanted surface 220. Since the two images are perpendicular to one another, the beam block 165 will be rotated 90-degrees from the image of interest. Since the beam block 165 has a finite width, it will produce a gap in the middle of the image on the photodetector 120. Having thus blocked the unwanted image the light reflected from the surface of interest 210 can be used to generate a focus error signal that depends only on the location of the surface of interest. Because the beam block has non-zero thickness, the system has also been desensitized at some level to tilt caused by light reflected from both surfaces, from target thickness variation and from reflectance variation. The remaining line focus at the photodetector 120 averages the focus information to reduce the effect of local asperities, but only at the surface of interest.

One disadvantage of this toric-based alternate embodiment is that it is not effective where there are more than two surfaces, such as with a multi-layered target. However, this approach is preferable to previous toric-based methods where the light collected from both surfaces was averaged and an offset was applied. The focus sense signal of that method was corrupted by any tilt of the surface of interest, and variations in the optical properties of the glass substrate.

Both the afocal relay and toric-based embodiments require a minimum separation between the two surfaces in question. While there is no hard limit to the minimum separation, it becomes progressively more difficult to construct a workable system as the distance between the two surfaces decreases. This is due to the close spacing of the two images and the very small size of the necessary beam block. In the case of the afocal relay system it is advantageous to increase the magnification of the pair of lenses consisting of the objective and the relay lens nearest to it.

The focus sensing system 100 will typically be used as part of a more complete autofocus system. As seen in the minimal autofocus system of FIG. 6, a focus sensing system 100 may supply focus error data directly to servomechanism 400 to control the position of objective lens 130 with respect to the target 200. Alternately, the servomechanism 400 may be made to reposition the target 200 with respect to the objective lens 130.

While the present invention has been described with respect to various preferred and alternate embodiments, there is no implication to restrict the present invention to preclude other implementations that will be apparent to those skilled in the related arts. It is easily recognized that the described invention may be implemented with a variety of alternative subsystems created in part by rearrangement of certain optical elements. Therefore, it is not intended that the invention be limited to the disclosed embodiments or to the specifically described details insofar as variations can be made within the spirit and scope of the appended claims.

What is claimed is:

1. A focus sensing system for sensing the distance between an objective lens and a target, the focus sensing system comprising:
   a light source emitting an outgoing reference beam of light, wherein a portion of the outgoing reference beam is reflected from a surface of the target as an incoming reference beam, the objective lens conducting the outgoing reference beam and the incoming reference beam, and the objective lens defining an optical axis;

a photodetector positioned in the path of the incoming reference beam and adapted to generate an electronic signal according to the displacement between the objective lens and a surface of the target;

one or more optical elements positioned to transmit or reflect the outgoing reference beam and the incoming reference beam; and a beam block positioned to selectively block an image in the incoming reference beam corresponding to an undesirable reflection from a surface proximate to the target, whereby the electronic signal may be used to adjust the displacement between the objective lens and the target.

2. The focus sensing system of claim 1, wherein the optical elements comprise an afocal relay, the afocal relay comprising: a first relay lens and a second relay lens.

3. The focus sensing system of claim 2, wherein the beam block is positioned within the afocal relay, between the first relay lens and the second relay lens, and positioned such that the beam block blocks unwanted light reflected from a surface displaced from the target surface.

4. The focus sensing system of claim 2, further comprising: a scanning element capable of controllably deflecting the outgoing reference beam and the incoming reference beam.

5. The focus sensing system of claim 4, wherein the scanning element comprises: a scanning mirror, and wherein the beam block is positioned between the scanning mirror and the photodetector.

6. The focus sensing system of claim 5, wherein the scanning mirror operates about a single axis.

7. The focus sensing system of claim 5, wherein the scanning element operates about two axes.

8. The focus sensing system of claim 1, further comprising: a reflecting knife-edge element positioned to obstruct a portion of the outgoing reference beam on a first side of the optical axis and to reflect to the photodetector a portion of the incoming reference beam on the first side of the optical axis.

9. The focus sensing system of claim 1, further comprising: a beamsplitter positioned to reflect the outgoing reference beam, to reflect the incoming reference beam, and to transmit an image beam that passes through the objective lens.

10. The focus sensing system of claim 1, wherein the optical elements comprise: one or more toric elements, wherein each toric element forms two line foci, a first line focus on a first surface of the target and a second line focus on a second surface of the target, the first and second line foci being perpendicular each to the other, and wherein the beam block is positioned to selectively block an image in the incoming reference beam corresponding to one of the perpendicular foci.

11. A method of creating an in-focus image, comprising: emitting an outgoing reference beam through an objective lens;

directing the outgoing reference beam onto a target surface, wherein the outgoing reference beam is reflected as an incoming reference beam, and wherein the incoming reference beam comprises a desirable reflected beam from the target surface and an unwanted reflected beam from a surface other than the target surface;

generating a real image from each of the two reflected beams;

spatially separating the two real images;

blocking the real image of the unwanted reflected beam;

detecting the real image of the desirable reflected beam to determine the relative displacement of an in-focus region from the target surface; and adjusting the displacement of the in-focus region.

12. The method of claim 11, wherein the step of spatially separating the two real images uses an afocal relay.

13. The method of claim 11, wherein the step of spatially separating the two real images uses one or more toric elements.

* * * * *